United States Patent [19]
Ashman

[11] Patent Number: 5,823,555
[45] Date of Patent: Oct. 20, 1998

[54] CYCLE WHEEL MOUNTING APPARATUS

[76] Inventor: J. Leonard Ashman, 3962 Third Ave., Sacramento, Calif. 95817

[21] Appl. No.: 663,405

[22] Filed: Jun. 13, 1996

Related U.S. Application Data

[63] Continuation-in-part of Ser. No. 225,837, Apr. 11, 1994, Pat. No. 5,549,315.

[51] Int. Cl.$^6$ .................................................. B62K 25/02
[52] U.S. Cl. ...................... 280/279; 280/288; 301/110.5; 301/111; 301/124.2
[58] Field of Search .................................... 280/279, 270, 280/274, 281.1, 287, 288; 301/111, 112, 114, 115, 120, 121, 124.1, 124.2, 128, 110.5, 110.6, 105.1

[56] References Cited

U.S. PATENT DOCUMENTS

| | | |
|---|---|---|
| 4,079,958 | 3/1978 | Segawa . |
| 4,170,369 | 10/1979 | Strutman . |
| 4,400,038 | 8/1983 | Hosokawa . |
| 4,634,139 | 1/1987 | Watanabe et al. . |
| 4,659,097 | 4/1987 | Kupper . |
| 4,805,941 | 2/1989 | Downing et al. . |
| 5,022,672 | 6/1991 | Kawai . |
| 5,058,913 | 10/1991 | La Riviere et al. . |
| 5,118,125 | 6/1992 | Plunkett . |
| 5,284,383 | 2/1994 | Lehanneur ........................... 301/124.2 |
| 5,326,157 | 7/1994 | Nagano . |
| 5,601,299 | 2/1997 | Yun ......................................... 301/120 |
| 5,647,643 | 7/1997 | Noble ................................... 301/110.5 |

FOREIGN PATENT DOCUMENTS

WO 87/04129  7/1987  WIPO .

Primary Examiner—Anne Marie Boehler
Attorney, Agent, or Firm—Thomas R. Lampe

[57] ABSTRACT

Apparatus for mounting a cycle wheel on a cycle frame includes a cycle wheel hub assembly including a wheel support axle and a hub member rotatably mounted on the wheel support axle. The axle includes movable axle end segments which are movable between a retracted position and an extended position. In their extended positions the axle ends are secured to wheel supports connected to the cycle legs.

12 Claims, 7 Drawing Sheets

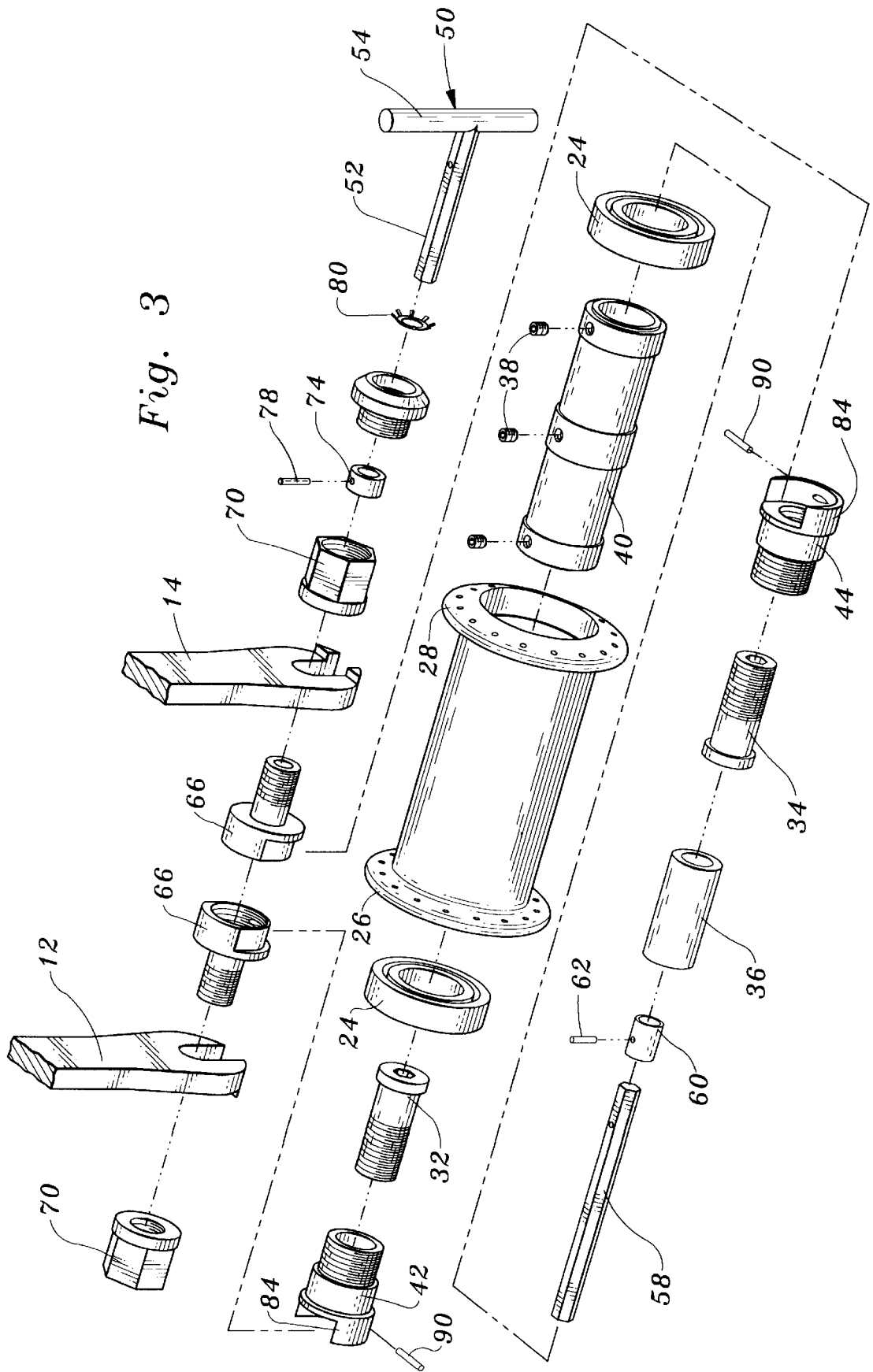

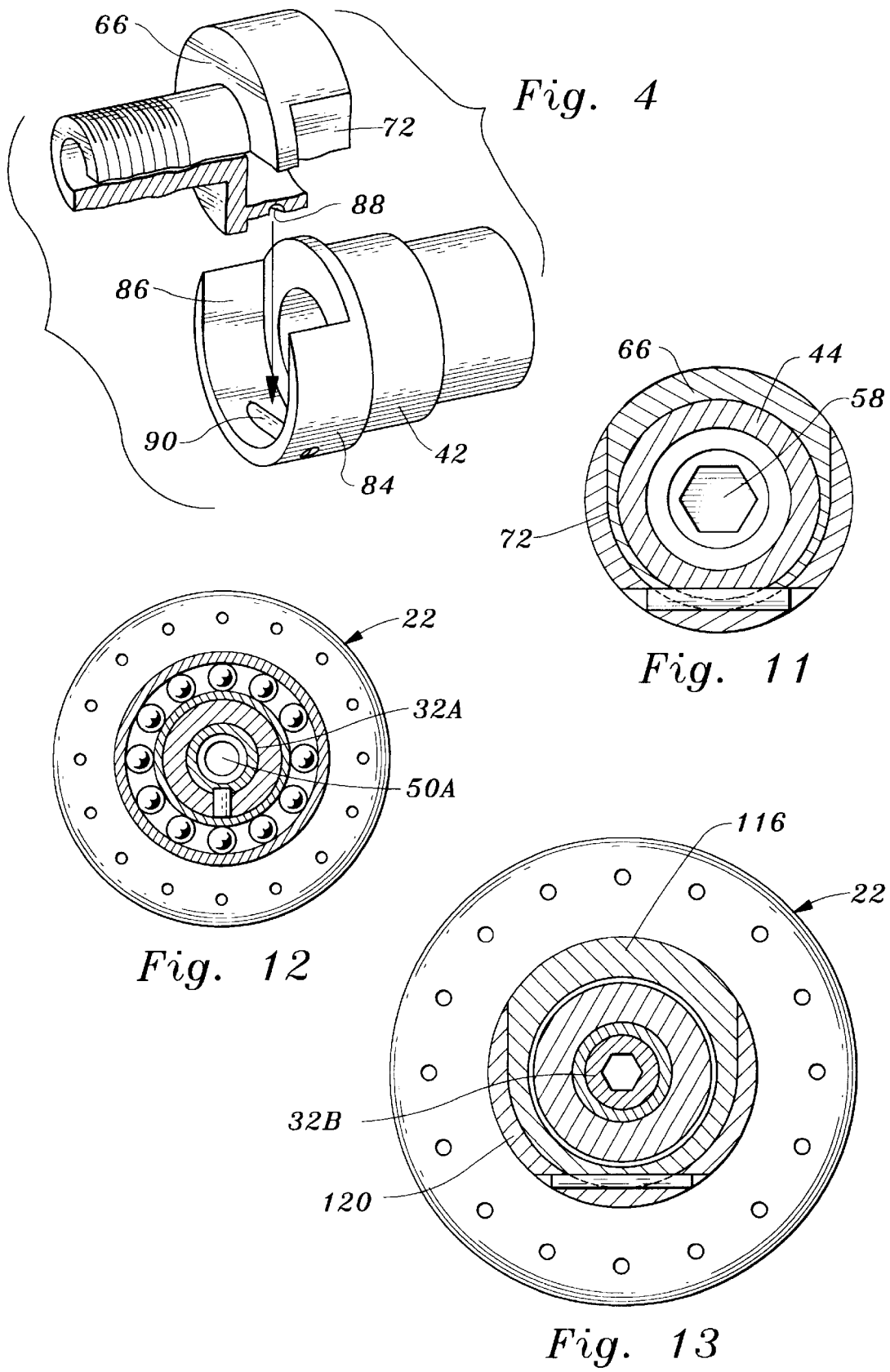

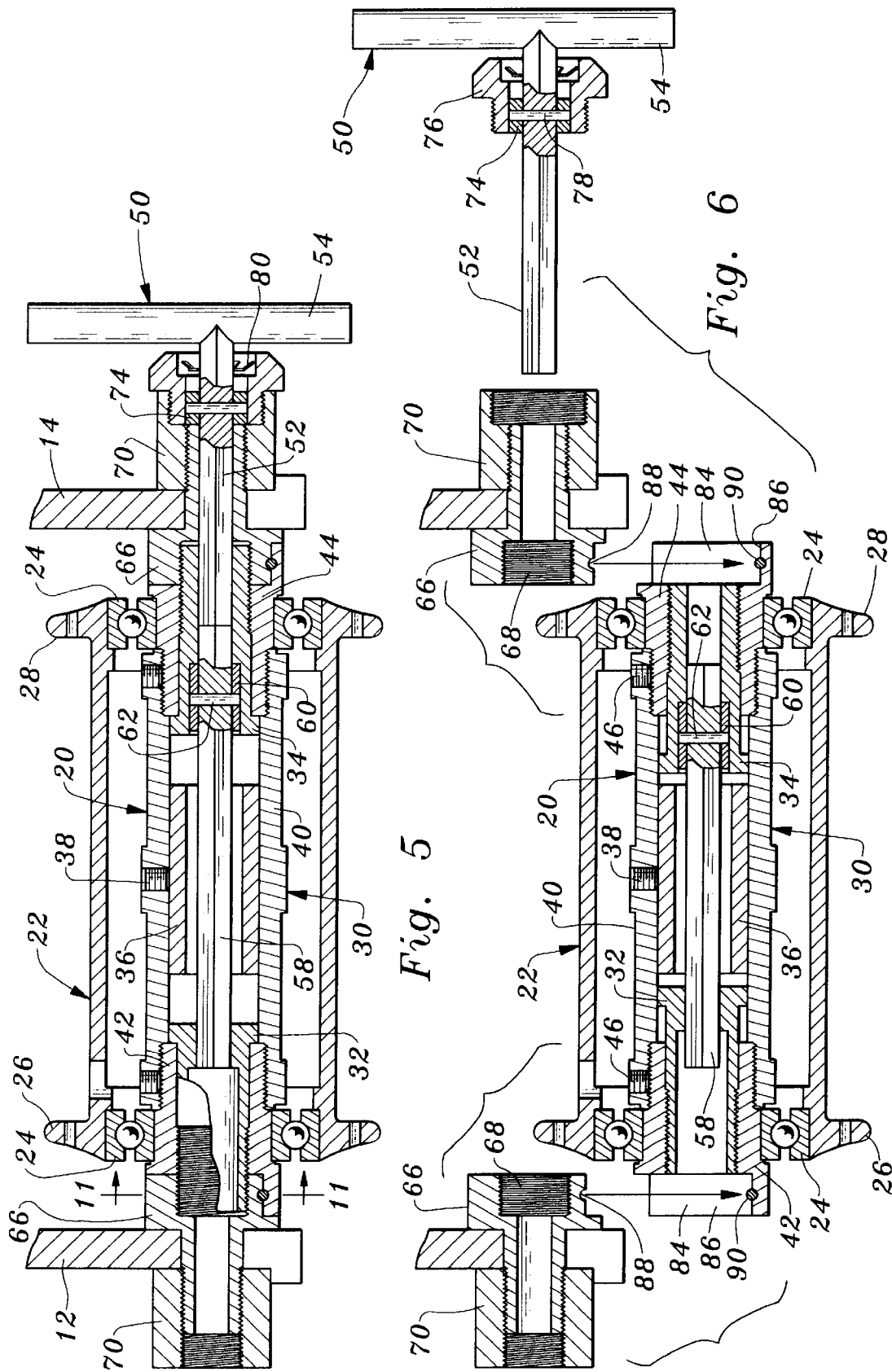

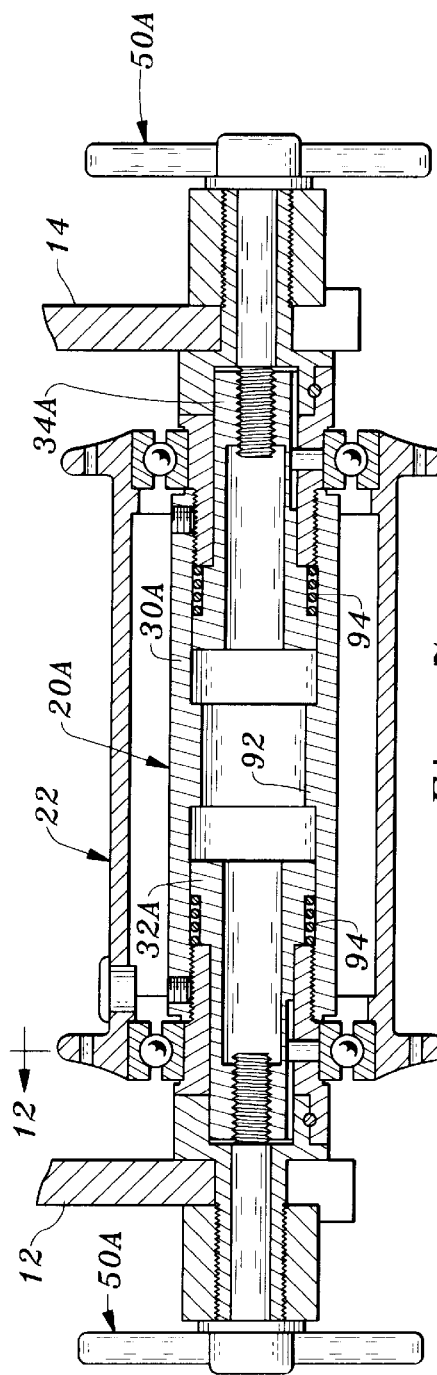
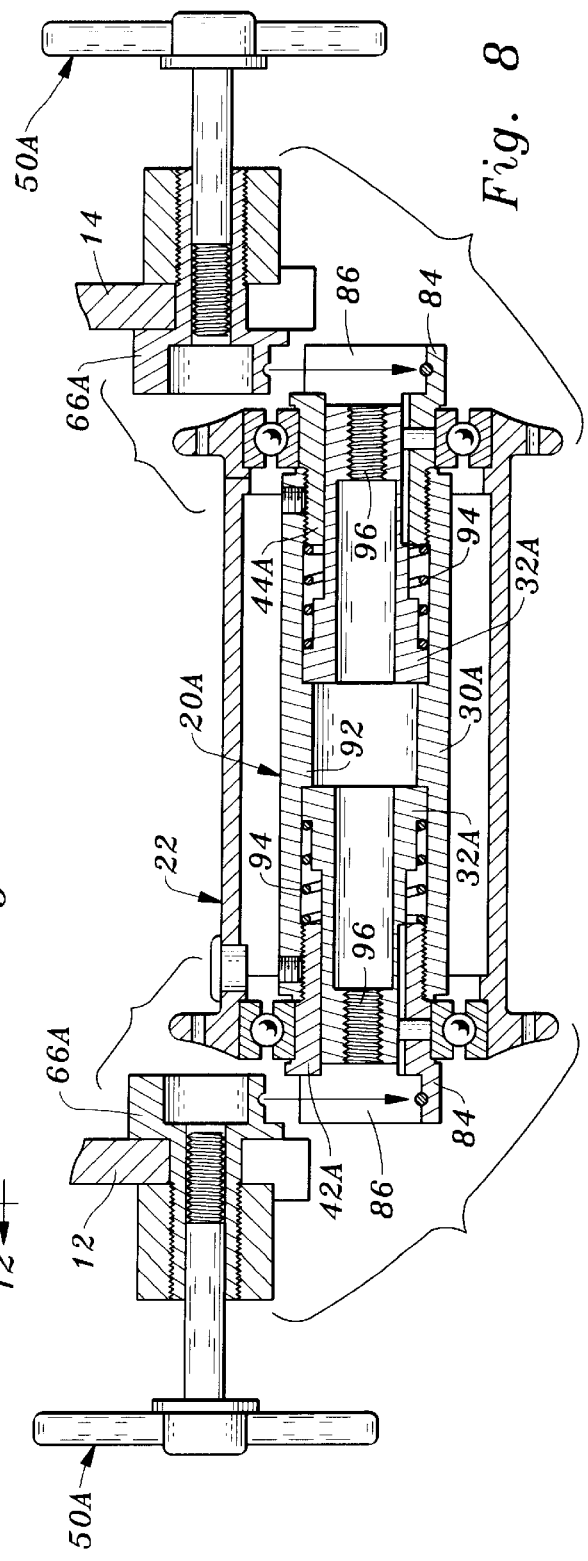

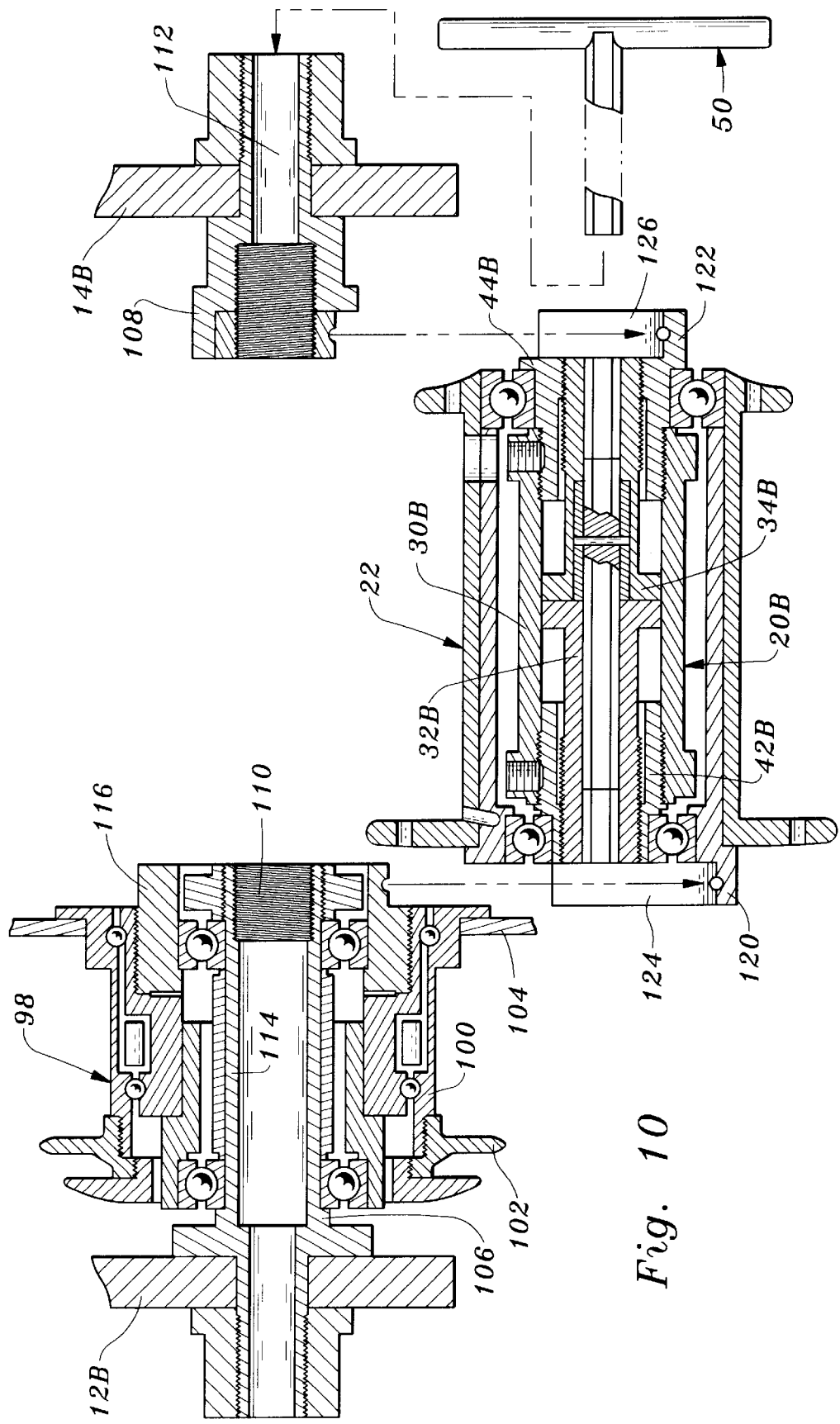

ly, 1983, U.S. Pat. No. 4,805,941,

CYCLE WHEEL MOUNTING APPARATUS

This application is a continuation-in-part of U.S. patent application Ser. No. 08/225,837, filed Apr. 11, 1994 now U.S. Pat. No. 5,549,315.

TECHNICAL FIELD

This invention relates to apparatus for mounting a cycle wheel on a cycle frame. More particularly, the apparatus is useful for mounting a cycle wheel at either the front or rear of the cycle. The cycle wheel can be quickly removed and installed at either the front or back locations.

BACKGROUND ART

My copending U.S. patent application Ser. No. 08/225,837, filed Apr. 11, 1994, discloses apparatus for mounting a cycle wheel at either the front or rear end of a cycle. Socket members defining notches are connected to the front and back forks of the bicycle for receiving wheel support members. The apparatus includes a lock for selectively locking the socket members against movement with the notches both oriented in a desired direction so that cycle wheel removal and installation is facilitated.

Applicant is aware of the following United States Patents relating to cycle wheel installation on bicycles and the like: U.S. Pat. No. 4,170,369, issued Oct. 9, 1979, U.S. Pat. No. 5,118,125, issued Jun. 2, 1992, U.S. Pat. No. 5,058,913, issued Oct. 22, 1991, U.S. Pat. No. 4,659,097, issued Apr. 21, 1987, U.S. Pat. No. 5,022,672, issued Jun. 11, 1991, U.S. Pat. No. 4,634,139, issued Jan. 6, 1987, U.S. Pat. No. 4,400,038, issued Aug. 23, 1983, U.S. Pat. No. 4,805,941, issued Feb. 21, 1989, U.S. Pat. No. 4,079,958, issued Mar. 21, 1978, and U.S. Pat. No. 5,326,157, issued Jul. 5, 1994. Applicant is also aware of International Publication No. W087/04129, published Jul. 16, 1987.

DISCLOSURE OF INVENTION

The present invention relates to apparatus for mounting a cycle wheel on a cycle frame, the cycle frame including at least one fork having first and second cycle legs with distal ends. The cycle legs are located away from one another and define a space therebetween for accommodating a cycle wheel.

The apparatus allows a wheel to be quickly changed. A wheel held in position on a cycle in accordance with the teachings of the present invention is positively and accurately maintained in the desired position.

The apparatus is directed to a combination including a cycle wheel hub assembly including a wheel support axle and a hub member disposed about the wheel support axle and rotatably mounted on the wheel support axle. The wheel support axle includes an axle primary segment located within the hub member and having opposed axle primary segment ends. The axle additionally includes first and second axle end segments connected to the axle primary segment at said opposed axle primary segment ends and having distal ends.

At least one of the axle end segments is a movable axle end segment selectively movable relative to the axle primary segment between a retracted position and an extended position. The distal end of the movable axle end segment is disposed further from the axle primary segment when in the extended position then when in the retracted position.

A first wheel support is located at the distal end of the first cycle leg.

A second wheel support is located at the distal end of the second cycle leg.

The axle end segments are connected to the wheel supports when the movable axial end segment is in the extended position to releasably retain the cycle wheel in the space defined by the cycle legs.

Other features, advantages, and objects of the present invention will become apparent with reference to the following description and accompanying drawings.

BRIEF DESCRIPTION OF DRAWINGS

FIG. 3 is an exploded, perspective view of the apparatus;

FIG. 4 is an enlarged, perspective view illustrating selected details of the apparatus structure;

FIG. 5 is a cross-sectional view taken along the line 5—5 of FIG. 1 and showing the apparatus in assembled condition;

FIG. 6 is a view similar to FIG. 5 but illustrating the apparatus in a state of disassembly;

FIG. 7 is a view similar to FIG. 5 but illustrating an alternative embodiment of the invention;

FIG. 8 is a view similar to FIG. 6 but illustrating the alternative invention embodiment;

FIG. 10 is a cross-sectional view of the form of apparatus shown in FIG. 9 with the apparatus in disassembled condition;

FIG. 11 is a cross-sectional view taken along the line 11—11 in FIG. 5;

FIG. 12 is a cross-sectional view taken along the line 12—12 of FIG. 7; and

FIG. 13 is a cross-sectional view taken along the line 13—13 in FIG. 9.

BEST MODE FOR CARRYING OUT THE INVENTION

Figure 1:
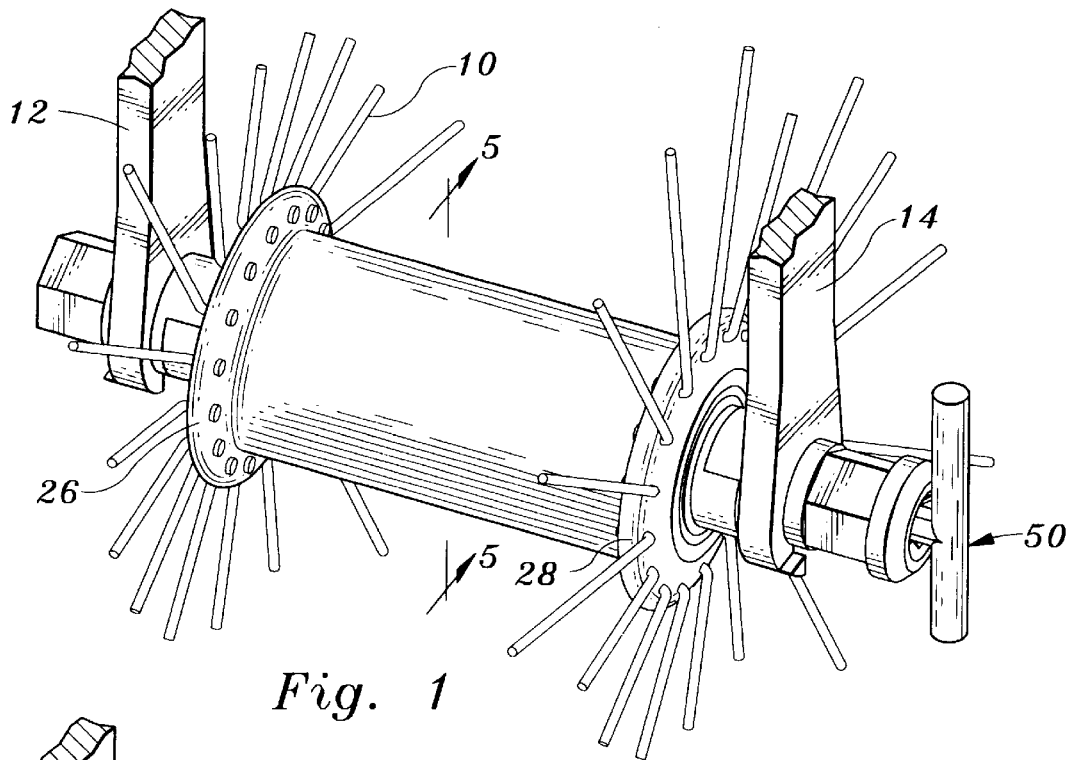
FIG. 1 is a perspective view of apparatus constructed in accordance with the teachings of the present invention holding a cycle wheel in position on a cycle frame.
Figure 2:
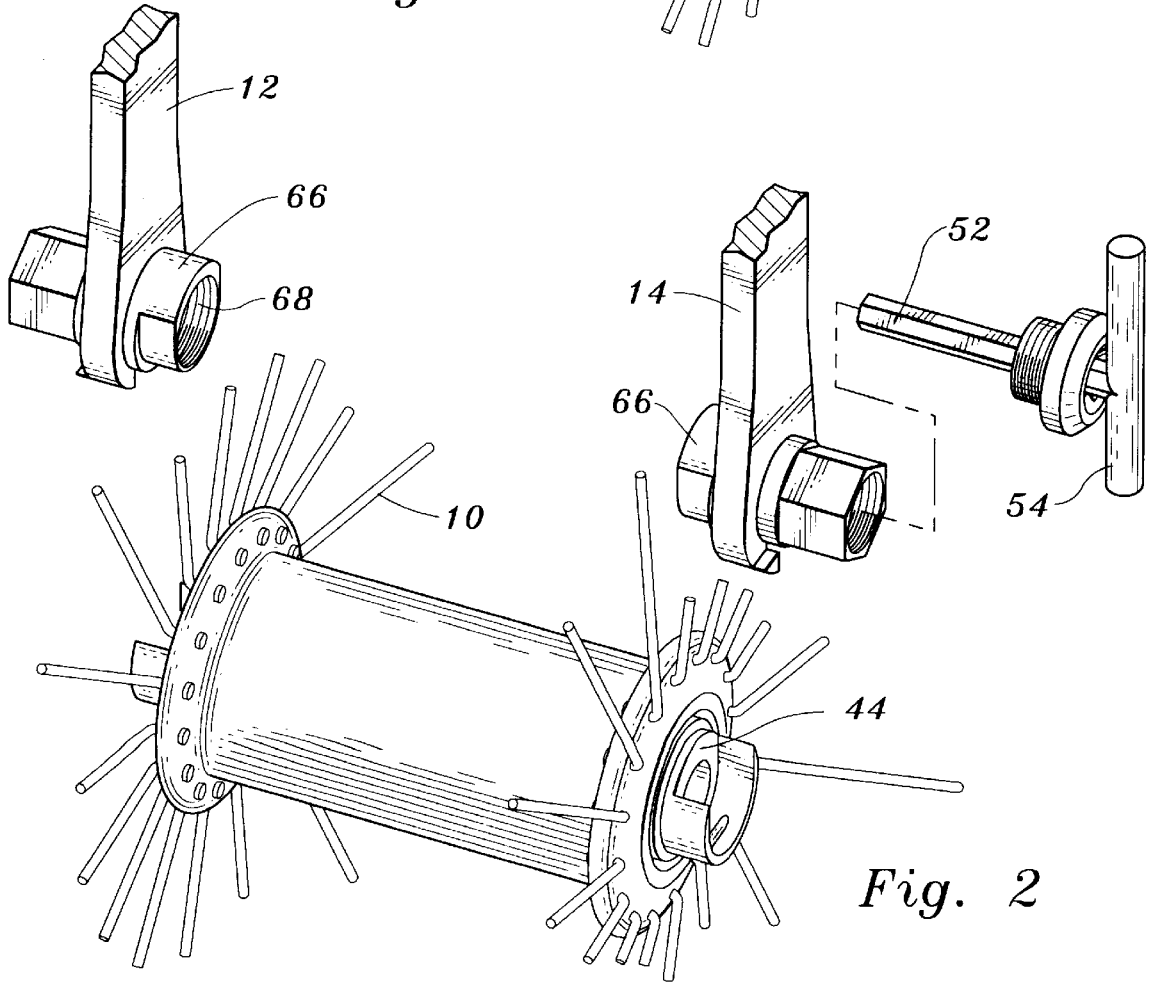
FIG. 2 is a view similar to FIG. 1, but illustrating the cycle wheel removed from the cycle frame.

Referring now to FIGS. 1–6 and 11, a preferred embodiment of the invention is illustrated. The disclosed embodiment is for mounting a cycle wheel 10 to a bicycle including a front fork having first and second cycle legs 12, 14 with distal ends. The cycle legs 12, 14 are located away from one another and define a space therebetween for accommodating the cycle wheel.

It is to be understood, of course, that the bicycle also includes a rear fork having legs 16, 18 (FIGS. 9, 10 and 13) which also have distal ends, the cycle legs 16, 18 also being located away from one another and defining a space therebetween for accommodating a rear cycle wheel.

Cycle wheel 10 incorporates a hub assembly including a wheel support axle 20 having a hub member 22 disposed thereabout and rotatably mounted thereon. Roller bearings 24 of conventional construction are disposed between the wheel support axle and the hub member. Hub member 22 includes end flanges 26, 28 which are utilized to retain spoke ends therein in a conventional manner. In the interest of simplicity, these spokes are not shown in all of the figures. Of course, the teachings of the present invention also have application to cycle wheels without spokes.

Wheel support axle 20 includes a cylindrically-shaped axle primary segment 30 having a throughbore formed therein. Positioned within the axle primary segment throughbore are axle end segments 32, 34. The axle end segments are mounted for movement within the axle primary segment. More particularly, the axle end segments 32, 34 are both rotatable with respect to the axle primary segment and axially movable relative thereto along the axis of rotation of the cycle wheel. A stop member 36 is disposed within the axle primary segment 30 to restrict inward movement of the axle end segments. A set screw 38 is employed to retain the stop member at the desired location within the axle primary segment.

Axle primary segment 30 includes a central portion 40 and retainer members 42, 44 which are threadedly engaged with the threaded interior of the central portion. Set screws 46 are utilized to lock the retainer members in place relative to the central portion.

The retainer members 42, 44 are not only threaded on the outside thereof but also on the inside thereof and these inner threads are engaged by threads formed on the outer surfaces of axle end segments 32, 34. It will be appreciated that rotation of the axle end segments 32, 34 relative to the retainer members 42, 44 will serve to either retract or extend the axle end segments.

A manually operable tool 50 is employed to extend or retract the axle end segments. Tool 50 includes a shaft 52 having a hexagonal cross-section and a handle 54 affixed thereto. FIG. 5 shows the tool shaft 52 extending through the distal end of cycle leg 14 and into axle end segment 34. Axle end segment 34 has an opening therethrough having an hexagonal shape corresponding to that of the tool handle. Rotation of the tool will cause the axle end segment 34 to either retract or extend due to its threaded interconnection with retainer member 34 depending upon whether such rotation is clockwise or counterclockwise.

Extending through stop member 36 and into the end of axle end segment 34 opposed to tool 50 is a connector in the form of a shaft or spindle 58 also having a hexagonal cross-section in the illustrated embodiment. Rotation of the axle end segment 34 by tool 50 will thus also cause rotation of the connector spindle.

Positioned in the end of the axle end segment 34 remote from the tool is a bushing 60 which surrounds the connector spindle 58 and is secured thereto by means of a connector pin 62 extending through the bushing and connector spindle. Such arrangement will maintain interconnection between the axle end segment 34 and the connector spindle as the axial and rotational movement described above takes place.

The other end of the connector spindle, i.e. the left end thereof is viewed in FIGS. 5 and 6, is positioned in a hex shaped opening formed at the inner end of axle end segment 32. Thus, rotation of the connector spindle 58 will serve to rotate axle end segment 32 along with axle end segment 34 to either retract or extend it. The connector spindle is free to move axially relative to axle end segment 34 since the connector spindle and the axle end segment 34 are in axially sliding engagement.

The threads of the axle end segments 32, 34 are in opposition to one another so that simultaneous rotation of the axle end segments will cause both to simultaneously either retract or simultaneously extend upon rotation. FIG. 5 shows both axle end segments extended so that their distal ends are spaced outwardly from the hub member. In FIG. 6 the axle end segments are in their retracted positions. In this instance, the distal ends of the axle end segments are essentially flush with the ends of the hub member.

Located at the distal end of each cycle leg is a wheel support 66 threaded internally as at 68. The wheel supports are located in notches or openings formed at the ends of the cycle legs and are secured to the cycle legs by means of a threaded shaft affixed to the wheel supports and threadedly engaging nuts 70 located on the opposed sides of the cycle legs. A concavity 72 is formed at the sides and bottoms of the wheel supports (See FIG. 11).

One of the nuts 70 in the illustrated embodiment is utilized to provide access by tool shaft 52 to above described axle end segment 34. More particularly, the nut is hollow as is its associated wheel support 66. A bushing having a circular inner and outer cross-section and designated by reference numeral 74 is rotatably positioned in an end cap 76 which is threadedly secured to the nut 70 accommodating the tool shaft. A pin 78 secures the bushing to the tool shaft. The bushing ensures proper alignment of the tool with the cooperating structural elements. A retainer clip 80 is located closely adjacent to the tool handle.

The wheel supports 66 are for the purpose of releasably retaining in position between the cycle legs 12, 14 the cycle wheel including the above-described hub assembly. Projecting outwardly from retainer members 42, 44 are extensions or sockets 84 defining notches 86. The notches are defined by the generally U-shaped inner walls of the sockets.

The notches 86 are configured to conform to the outer shapes of wheel supports 66 and FIG. 5 shows the wheel supports positioned in the socket notches. It will be noted that the axle end segments 32, 34 have to be in their retracted positions to allow the wheel supports to enter the socket notches.

When the wheel supports are fully seated in the sockets the wheel support axle 20 is coaxial with the wheel supports. Once the wheel supports are seated in the sockets the tool 50 is rotated to extend the axle end segments 32, 34 and thread them into engagement with the inner threads of the wheel supports as shown in FIG. 5. This results in a highly stable support for the cycle wheel. Also, such mechanism insures the prompt, accurate positioning of the cycle wheel relative to the cycle frame.

It will be noted that grooves 88 are formed at the bottoms of the wheel supports. These grooves receive detents 90 at the bottoms of the sockets 84. This arrangement insures that the hub assembly ends are brought into close proximity with the ends of the wheel supports 66 and prevented from moving away from the wheel support ends. This, in turn, means that the inner threads of the wheel supports are properly positioned to immediately receive the threads of the axle end segments when the latter are extended.

The hub assembly and cycle wheel can just as easily be removed, the operator simply rotating the tool to retract the axle end segments and disengage them from the wheel supports.

FIGS. 7, 8 and 12 illustrate an alternative embodiment of the invention wherein a wheel support axle 20A rotatably supports a hub member 22. In this embodiment of the invention an axle primary segment 30A forms a passageway or opening within which axle end segments 32A, 34A are slidably disposed. The axle end segments 32A, 34A are enlarged at the inner ends thereof and such ends normally bear against axle primary segment central portion 92 as shown in FIG. 8 under the urging of coil compression springs 94. The outer ends of the springs 94 bear against retainer members 42A, 44A. Internal threads 96 are formed in the outer ends of axle end segments 32A, 34A.

When one wishes to mount this version of the hub assembly, wheel supports 66A mounted on cycle legs 12, 14 are positioned in notches 86 of sockets 84 of the hub assembly in the manner described above with respect to the first described embodiment of the invention. Wheel supports 66A each have a central opening formed therein and a tool 50A is located within each wheel support. The tools 50A are threaded at their inwardly disposed ends. After the wheel supports 66A have been placed in notches 86, the tools 50A are brought into engagement with axle end segments 32A, 34A and rotated to thread the tools into threads 96 of the wheel supports. This causes the axle end segments 32A, 34A to be pulled outwardly or extended to lock the hub assembly to the cycle legs. Removal of the hub assembly is accomplished by unthreading the tools 50A.

Figure 9:
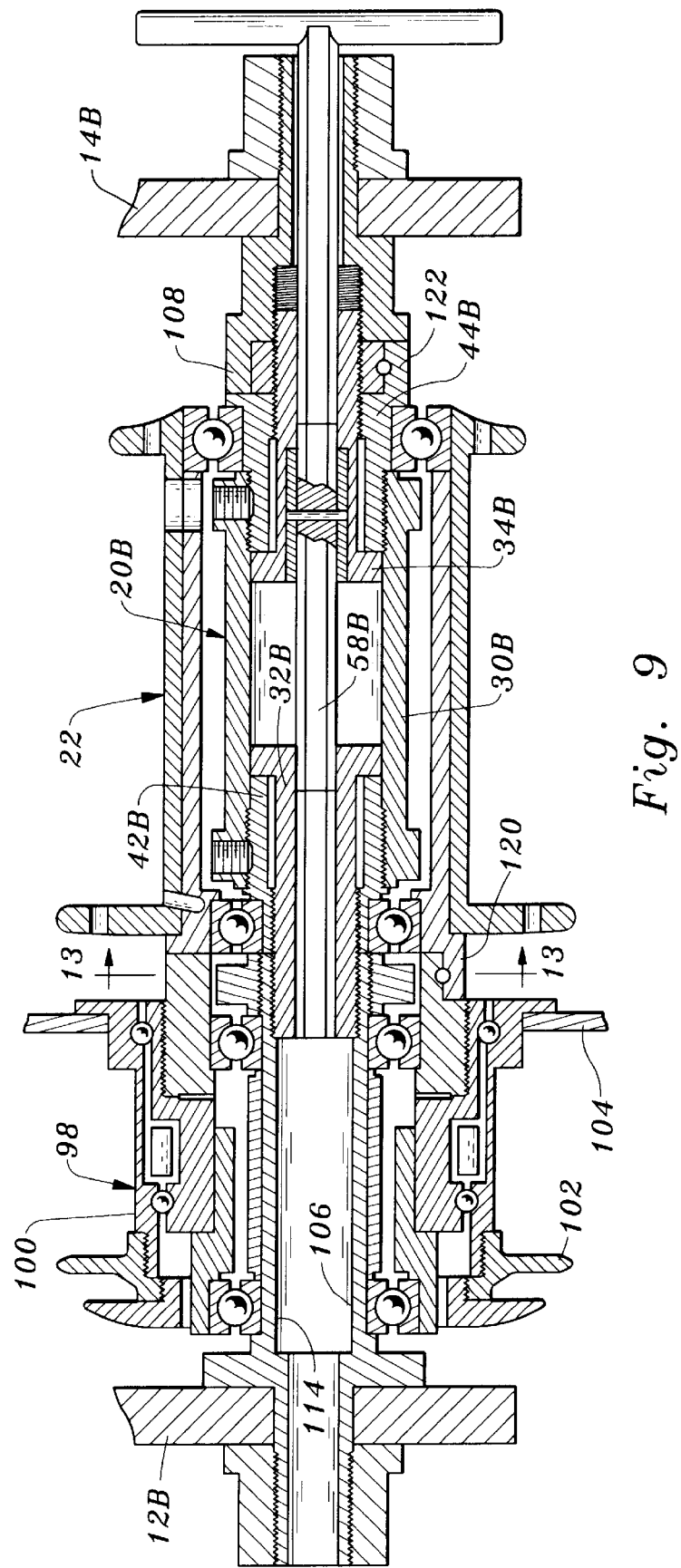
FIG. 9 is a cross-sectional view illustrating yet another embodiment of the invention utilized at the rear of a bicycle.

Referring now to FIGS. 9, 10 and 13, another embodiment of the invention is illustrated which is utilized in association with a bicycle rear drive 98 deployed between rear cycle legs 12B, 14B. The rear drive is of standard construction including a free wheel 100 and sprockets such as sprockets 102, 104. A wheel support 106 extends from leg 12B and is of sufficient length to support the drive mechanism. Wheel support 106 includes not only a central spindle portion 114 secured directly to leg 12B but also a bearing retainer 116 threadedly secured to the spindle portion. A wheel support 108 is secured to cycle leg 14B. The wheel supports 106, 108 define through passageways 110, 112, respectively.

Wheel supports 106, 108 are for the purposes of supporting a wheel and hub assembly including hub member 22 and wheel support axle 20B about which the hub member is rotatably disposed.

Wheel support axle 20B includes an axle primary segment 30B and axle end segments 32B, 34B which are slidably disposed within axle primary segment 30B. Retainer members 42B, 44B include internal threads which are threadedly engaged by the threads on the outer ends of axle end segments 32B, 34B.

A socket or extension 120 projects outwardly from retainer member 42B and a socket or extension 122 projects outwardly from retainer 44B. Socket 120 defines a notch 124 which is larger than notch 126 formed by socket 122 since notch 124 must accommodate therein bearing retainer 116 which in the arrangement illustrated is larger than wheel support 108.

With the axle end segments 32B, 34B in their respective retracted positions shown in FIG. 10, the wheel support 106 and the wheel support 108 are positioned in notches 124, 126, respectively. Tool 50 is then inserted through opening 112 of wheel support 108 and enters the interior of axle end segment 34B, it being understood that the interior has generally the same cross-sectional configuration as the working end of the tool.

Rotation of the tool will thus cause the axle end segment 34B to thread outwardly to its extended position shown in FIG. 9. A connector spindle 58B transmits this rotating motion to axle end segment 32B which causes the latter to also move to its extended position and thread into spindle portion 114 of wheel support 106. At the same time, of course, axle end segment 34B has been threaded into engagement with the inner threads of wheel support 108.

I claim:

1. Apparatus for mounting a cycle wheel on a cycle frame, said cycle frame including at least one fork having first and second cycle legs with distal ends, said cycle legs being located away from one another and defining a space therebetween for accommodating a cycle wheel, said apparatus comprising, in combination:

a cycle wheel hub assembly including a wheel support axle and a hub member disposed about said wheel support axle and rotatably mounted on said wheel support axle, said wheel support axle including an axle primary segment located within said hub member and having opposed axle primary segment ends and first and second axle end segments connected to said primary segment at said opposed axle primary segment ends and having distal ends, at least one of said axle end segments comprising a movable axle end segment selectively movable relative to said axle primary segment between a retracted position and an extended position, the distal end of said movable axle end segment being further from said axle primary segment when in said extended position than when in said retracted position;

a first wheel support adapted for mounting at the distal end of said first cycle leg; and a second wheel support adapted for mounting at the distal end of said second cycle leg, said axle end segments being connected to said wheel supports when said movable axle end segment is in said extended position to releasably retain said cycle wheel in the spaced defined by said cycle legs.

2. The apparatus according to claim 1 wherein both of said axle end segments are selectively movable relative to said axle primary segment and comprise shafts movable axially in opposed directions.

3. The apparatus according to claim 2 wherein said shafts are threaded and threadedly engage said axle primary segment.

4. The apparatus according to claim 2 wherein said wheel supports are threaded and are threadedly engaged by said axle end segments to releasably retain said cycle wheel in the space defined by said cycle legs.

5. The apparatus according to claim 3 additionally comprising axle end segment connection means interconnecting said axle end segments and cooperable therewith to simultaneously rotate said axle end segments to selectively provide either simultaneous retraction of said axle end segments or simultaneous extension thereof relative to said axle primary segment.

6. The apparatus according to claim 1 wherein said first and second wheel supports project toward one another, said cycle wheel hub assembly additionally including hub assembly extension elements attached to and extending outwardly from said wheel support axle for engagement with an connection to said wheel supports.

7. The apparatus according to claim 6 wherein either said hub assembly extension elements or said wheel supports define notches for receiving the other of said hub assembly extension elements or said wheel supports.

8. The apparatus according to claim 6 wherein said hub assembly extension elements and said wheel supports include means for preventing relative rotatable movement between said hub assembly extension elements and said wheel supports when said hub assembly extension elements and said wheel supports are in engagement.

9. The apparatus according to claim 8 wherein said hub assembly extension elements and said wheel supports include means for preventing said hub assembly extension elements and said wheel supports from moving away from each other when said hub assembly extension elements and said wheel supports are in engagement.

10. The apparatus according to claim 9 wherein said means for preventing said hub assembly extension elements and said wheel supports from moving away from each other includes detent means on either said hub extension elements or said wheel supports and indents defined by the other of said hub extension elements or said wheel supports for receiving said detent means.

11. The apparatus according to claim 1 additionally comprising a manually manipulable tool engageable with said movable axle end segment to selectively retract or extend said movable axle end segment.

12. The apparatus according to claim 11 including tool connector means connecting said tool element to said hub assembly.

* * * * *